United States Patent
Faibish et al.

(10) Patent No.: US 9,979,780 B1
(45) Date of Patent: May 22, 2018

(54) METHOD AND APPARATUS FOR SELECTION BETWEEN MULTIPLE CANDIDATE CLOUDS FOR JOB PROCESSING

(75) Inventors: Sorin Faibish, Newton, MA (US); John Bent, Los Alamos, NM (US)

(73) Assignee: EMC IP Holding Company LLC, Hopkinton, MA (US)

( * ) Notice: Subject to any disclaimer, the term of this patent is extended or adjusted under 35 U.S.C. 154(b) by 418 days.

(21) Appl. No.: 13/532,132

(22) Filed: Jun. 25, 2012

(51) Int. Cl.
*G06F 15/173* (2006.01)
*H04L 29/08* (2006.01)

(52) U.S. Cl.
CPC .............................. *H04L 67/1012* (2013.01)

(58) Field of Classification Search
USPC ....... 709/203, 217, 224, 225, 226, 228, 247, 709/249
See application file for complete search history.

(56) References Cited

U.S. PATENT DOCUMENTS

| | | | |
|---|---|---|---|
| 8,244,874 B1 * | 8/2012 | Thireault | 709/226 |
| 8,255,529 B2 * | 8/2012 | Ferris et al. | 709/224 |
| 8,351,453 B2 * | 1/2013 | Park et al. | 370/431 |
| 8,402,139 B2 * | 3/2013 | Ferris et al. | 709/226 |
| 8,433,749 B2 * | 4/2013 | Wee et al. | 709/203 |
| 8,442,498 B2 | 5/2013 | Yin et al. | |
| 8,631,099 B2 * | 1/2014 | Morgan | 709/220 |
| 8,745,242 B2 * | 6/2014 | Dawson et al. | 709/226 |
| 2008/0082601 A1 * | 4/2008 | Meijer et al. | 709/203 |
| 2011/0131335 A1 * | 6/2011 | Spaltro et al. | 709/228 |
| 2011/0153868 A1 * | 6/2011 | Castleberry | H04L 29/08846 709/246 |

(Continued)

FOREIGN PATENT DOCUMENTS

| | | |
|---|---|---|
| CN | 101364899 A | 2/2009 |
| CN | 102104631 A | 6/2011 |

(Continued)

OTHER PUBLICATIONS

OnStar Connections, "5 Tips to Get the Most Out of your Subscription," http://www.onstarconnections.com, 2011, 5 pages.

(Continued)

*Primary Examiner* — Michael Y Won
(74) *Attorney, Agent, or Firm* — Ryan, Mason & Lewis, LLP

(57) ABSTRACT

A processing device of an information processing system is configured to identify different candidate clouds for performing a processing job for a requesting user, to collect respective sets of parameters from the different candidate clouds with each such set of parameters characterizing at least one aspect of a manner in which the processing job would be performed in the corresponding candidate cloud, and to compile information characterizing the collected sets of parameters so as to permit informed selection by the requesting user or another system entity of at least a particular one of the candidate clouds for performing the processing job. The processing device may be further configured to permit the requesting user to monitor and/or control the processing job as it is executing in the selected cloud(s). For example, warnings may be provided to the user if execution of the processing job is not meeting specified user requirements.

21 Claims, 5 Drawing Sheets

(56) References Cited

U.S. PATENT DOCUMENTS

| | | | |
|---|---|---|---|
| 2011/0213875 A1* | 9/2011 | Ferris et al. | 709/224 |
| 2011/0238458 A1* | 9/2011 | Purcell et al. | 705/7.27 |
| 2011/0270963 A1* | 11/2011 | Saito et al. | 709/224 |
| 2011/0273625 A1 | 11/2011 | McMahon et al. | |
| 2011/0295998 A1* | 12/2011 | Ferris et al. | 709/224 |
| 2011/0314082 A1* | 12/2011 | Koneti et al. | 709/203 |
| 2012/0079480 A1 | 3/2012 | Liu | |
| 2012/0081299 A1 | 4/2012 | Xiao et al. | |
| 2012/0124194 A1* | 5/2012 | Shouraboura | 709/224 |
| 2012/0124211 A1* | 5/2012 | Kampas et al. | 709/226 |
| 2012/0158821 A1* | 6/2012 | Barros | 709/203 |
| 2012/0239739 A1* | 9/2012 | Manglik et al. | 709/203 |
| 2012/0303740 A1* | 11/2012 | Ferris | 709/217 |
| 2013/0080509 A1* | 3/2013 | Wang | 709/203 |
| 2013/0080623 A1* | 3/2013 | Thireault | 709/224 |
| 2013/0111034 A1* | 5/2013 | Upadhya | 709/226 |
| 2013/0238752 A1* | 9/2013 | Park et al. | 709/217 |
| 2013/0238805 A1* | 9/2013 | Catrein et al. | 709/226 |
| 2013/0332979 A1 | 12/2013 | Baskaran et al. | |

FOREIGN PATENT DOCUMENTS

| | | |
|---|---|---|
| CN | 102143025 A | 8/2011 |
| WO | 2012053243 A1 | 4/2012 |

OTHER PUBLICATIONS iClarified, "Verizon FiOS Mobile App Lets You Program Your DVR Using iPad," http://www.iclarified.com, 2010, 2 pages.

* cited by examiner

METHOD AND APPARATUS FOR SELECTION BETWEEN MULTIPLE CANDIDATE CLOUDS FOR JOB PROCESSING

FIELD

The field relates generally to information processing systems, and more particularly to cloud-based information processing systems.

BACKGROUND

Public clouds are increasingly being utilized to meet the information technology needs of individuals, business enterprises and other users. Such public clouds may be shared by a very large number of users, and therefore performance can be highly unpredictable. For example, performance of a given public cloud may vary significantly from user to user and also from processing job to processing job for a given user, based on a variety of factors that are usually not readily apparent to the users. Moreover, users often have multiple options in terms of the particular public clouds to utilize for different processing jobs, but no reliable mechanism is available to assess the relative advantages of these public clouds as applied to a particular processing job.

Even though data may be available within a cloud-based information processing system that could assist users in assessing public cloud performance, such data is often in large part kept confidential by the corresponding cloud service provider, and therefore is typically limited to use by internal information technology administrators and other personnel of the cloud service provider.

Related problems include a general inability in conventional cloud-based information processing systems for users to adequately oversee certain aspects of processing job execution that are of particular interest to them.

Accordingly, users can often feel as though they have insufficient control over any of their processing jobs that are executing in the public cloud. This has become a barrier to more widespread adoption of public cloud processing models.

A need therefore exists for improved techniques for user interaction with public clouds and other cloud-based processing systems.

SUMMARY

Illustrative embodiments of the present invention provide techniques for selecting between multiple candidate clouds for performing a given processing job on behalf of a requesting user.

In one embodiment, at least one processing device of an information processing system comprises a processor coupled to a memory. The processing device is configured to identify different candidate clouds for performing a processing job for a requesting user, to collect respective sets of parameters from the different candidate clouds with each such set of parameters characterizing at least one aspect of a manner in which the processing job would be performed in the corresponding candidate cloud, and to compile information characterizing the collected sets of parameters so as to permit informed selection by the requesting user or another system entity of at least a particular one of the candidate clouds for performing the processing job.

By way of example, the processing device may be further configured to present at least a portion of the compiled information characterizing the collected sets of parameters to the user in a manner that permits the user to select at least one of the candidate clouds for performing the processing job. Alternatively, the selection of one or more of the candidate clouds may be performed by a system entity other than the user, such as an application server implemented in another public or private cloud associated with the user.

The processing device may additionally or alternatively be configured to permit the user to monitor and/or control the processing job as it is executing in the selected cloud(s). For example, warnings may be provided to the user if execution of the processing job is not meeting specified user requirements.

The plurality of different candidate clouds for performing the processing job may be identified responsive to input from the user defining one or more requirements of the processing job. Such user input may be provided via an application client running on a mobile device, computer or other user device associated with that user, and may involve specification of processing job requirements relating to quality of service (QoS), such as average latency, number of processor cores, disk space and network throughput.

The processing device may comprise an application server running on the processing device, with the application server being configured to select at least one of the candidate clouds for performing the processing job.

In such an arrangement, the application server may be initiated responsive to an application client running on a mobile device, computer or other user device associated with the requesting user. The application server may present via one or more user interface screens of the user device at least a portion of the compiled information characterizing the collected sets of parameters in a manner that permits the user to select at least one of the candidate clouds for performing the processing job.

The application server in one or more embodiments may be implemented at least in part by a broker entity that is distinct from cloud service providers of the candidate clouds as well as the requesting user. The broker entity may receive a fee from at least one of the cloud service providers and the requesting user.

The processing job to be performed may comprise running multiple applications on multiple virtual machines of cloud infrastructure. The term "application" as used herein is intended to be broadly construed, and these multiple applications may comprise entirely different applications or different instances of a given application, as well as combinations of different applications and application instances.

One or more of the illustrative embodiments described herein exhibit improved performance relative to conventional cloud arrangements. For example, the disclosed arrangements can be used to ensure that a particular processing job is being run in an optimal manner that satisfies the particular QoS needs of the requesting user. In order to win business from requesting users, cloud service providers will need to provide accurate information regarding the processing resources to be applied to a particular job, thereby enhancing user satisfaction with cloud-based services. This can lead to more widespread adoption of public cloud processing models, and as a result will ultimately benefit not only users but also cloud service providers.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1A:
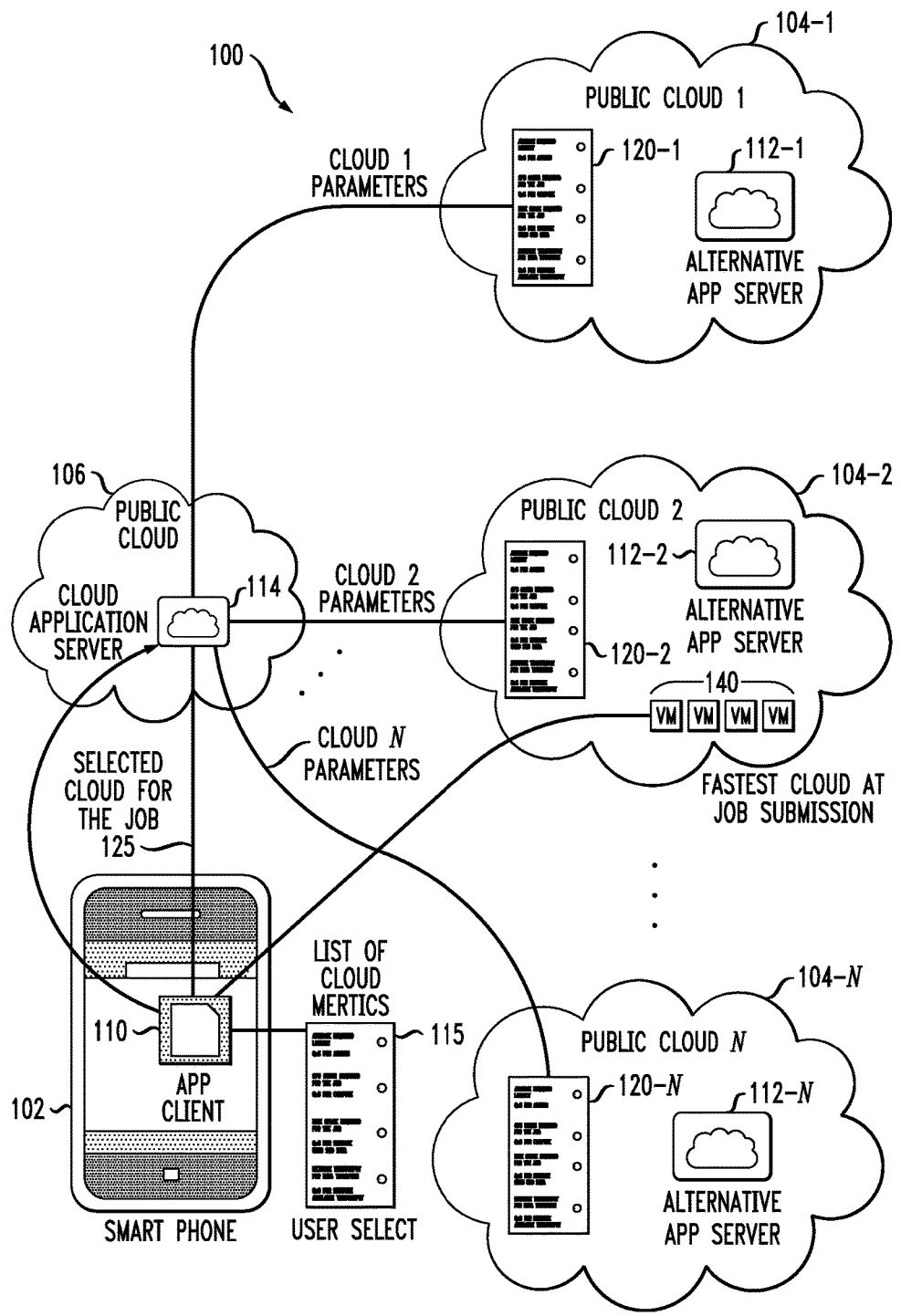
FIG. 1A is a block diagram of information processing system in an illustrative embodiment of the invention.

FIG. 1A shows an information processing system 100 configured in accordance with an illustrative embodiment of the present invention. The information processing system 100 comprises a user device 102, illustratively implemented as a mobile telephone, also referred to as a "smart phone," and cloud infrastructure illustratively comprising a plurality of candidate public clouds 104-1, 104-2, . . . 104-N and an additional public cloud 106. The user associated with user device may be an individual, a business enterprise, an IT administrator or other type of user. The term "user" as utilized herein is therefore intended to be broadly construed so as to encompass a human user as well as an inanimate system entity. Also, the term may refer to a human user, an associated device or set of devices, or a combination of both a human user and an associated device or set of devices. The same reference numeral 102 may be used for all of these cases, with the particular user arrangement being understood from the context.

Although the user device 102 is shown as a mobile telephone in the figure, other embodiments can utilize other types of user devices, such as laptop or desktop computers, tablet computers, or other processing devices suitable for interacting with cloud infrastructure over one or more networks.

The user or users associated with user device 102 may be considered tenants of one or more of the clouds 104 or 106 of the cloud infrastructure of system 100. Also, although illustratively identified as a public cloud in the figure, the cloud 106 may instead be a private cloud associated with the user or users.

Moreover, the system 100 can of course be configured to support a large number of user devices, although only a single user device is shown in the figure for simplicity and clarity of illustration. Also, multiple users may be permitted to access current status information and other data associated with a given processing job that is executing in one or more of the clouds 104 of the cloud infrastructure. For example, each processing job that is executing may be provided with a unique job identifier, and users that enter the job identifier and an appropriate password may obtain access to the associated job data. Other types of authentication mechanisms may be implemented in system 100 in order to ensure the security of the processing jobs as those jobs are executed in the cloud infrastructure.

The cloud infrastructure of system 100 may be viewed as comprising physical infrastructure and associated virtualization infrastructure running on the physical infrastructure, and such infrastructure or portions thereof may be implemented using one or more processing devices of a processing platform. Examples of processing platforms that may form at least portions of the cloud infrastructure in system 100 will be described in more detail below in conjunction with FIGS. 3 and 4.

As noted above, the system 100 in the present embodiment implements various processes that provide enhanced user control over processing jobs that are executed in public clouds 104 of the cloud infrastructure. An example of such a process will be described in conjunction with FIG. 2, but it is to be appreciated that numerous other types of processes may be used in other embodiments.

A given cloud infrastructure processing device or user processing device generally comprises at least one processor and an associated memory, and includes one or more functional modules for controlling certain features of the system 100.

For example, the user device 102 in the present embodiment may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. This memory and other memories disclosed herein may be viewed as examples of what are more generally referred to as "computer program products" storing executable computer program code.

The user device 102 may also include network interface circuitry that is configured to allow the user device to communicate over one or more networks with the cloud infrastructure of system 100, and possibly with other user devices, and may comprise one or more conventional transceivers. The one or more networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Similar processor, memory and network interface elements may be utilized in processing devices that provide public clouds 104 and 106 of the cloud infrastructure.

In the present embodiment, the user device 102 implements an application client 110, and each of the N public clouds 104 implements an application server 112. Also, the additional public cloud 106 implements an application server 114, also referred to in the figure as a cloud application server. The application client 110 and application servers 112 and 114 are generally implemented at least in part in the form of software that is stored in a memory and executed by a processor using one or more processing devices of the type described above. By way of example, one or more of the application servers 112 and 114 may be implemented as application plug-ins for other applications that perform additional functions within their respective public clouds 104 or 106.

The system 100 is generally configured to support informed selection of one or more of the public clouds 104 to execute a particular processing job on behalf of a requesting user. Thus, using the application client 110 and the application servers 112 and 114, multiple candidate clouds generally representing at least a subset of the public clouds 104 are identified as candidate clouds for performing the processing job for the requesting user. The public clouds 104 will therefore also be referred to herein as candidate clouds. Respective sets of parameters are collected from the different candidate clouds with each such set of parameters characterizing at least one aspect of a manner in which the processing job would be performed in the corresponding candidate cloud. Information is compiled that characterizes the collected sets of parameters so as to permit informed selection of at least one of the candidate clouds for performing the processing job.

The term "compiled" in this context is intended to be broadly construed so as to encompass, for example, selection of particular parameters or associated values from at least a portion of the collected parameter sets for presentation or other processing, or comparison of one or more parameter values from each of at least a portion of the collected parameter sets so as to generate a recommendation. Numerous other types of compilation of information characterizing parameter sets are contemplated in other embodiments. Also, the parameter sets are intended to be broadly construed, and a given such set may in some instances relate, for example, to only a single specified parameter involving cloud performance.

The application servers 112 are more particularly identified in the figure as alternative application servers because each is associated with a different candidate public cloud 104 that may represent an alternative execution environment for a particular processing job of a requesting user.

The actual selection of one or more of the candidate clouds to perform a particular processing job may be made by the requesting user, or automatically by another system entity, such as the application server 114 in public cloud 106. The collection of parameter sets and compilation of information characterizing those sets may also be performed by the application server 114, through interaction with the alternative application servers 112 in the respective public clouds 104.

In an implementation in which the selection between the various candidate clouds for performing a given processing job is made by the application server 114, the application server may cache relevant parameters sets and other information characterizing the performance of the public clouds 104 on other possibly related processing jobs, for the requesting user or possibly other users. The application server 114 can also maintain an up-to-date sorted list of the available resources of each of the public clouds 104 and then decide on behalf of the requesting user the best selection of cloud resources for use with a particular processing job. In such an arrangement, the user may select the metrics required for the job, and the application server 114 can do the rest automatically, including selecting the best cloud or clouds for execution of the processing job and reporting appropriate monitoring information back to requesting user as the processing job runs in the selected cloud(s). The application server may therefore decide to use multiple clouds for a given processing job if the required resources for that job are not available in a single cloud.

In an implementation in which the selection between the various candidate clouds for performing a given processing job is made by the user, the system 100 may be configured to present at least a portion of the compiled information characterizing the collected sets of parameters to the user in a manner that permits the user to select at least one of the candidate clouds for performing the processing job.

The application server 114 may be initiated responsive to instructions received from the application client 110 running on the user device 102. The application server 114 can then interact with the alternative application servers 112 in the respective candidate clouds 104 in order to collect the parameter sets. The application server 114 compiles information characterizing those collected parameter sets, and presents via one or more user interface screens of the user device 102 at least a portion of the compiled information in a manner that permits the user to select at least one of the candidate clouds for performing the processing job. The processing job itself may involve running one or more applications on at least one virtual machine of at least one selected cloud.

The identification of which of the public clouds 104 will be considered candidate clouds for performance of a given processing job may be made responsive to input from the user defining one or more requirements of the processing job. Alternatively, all of the public clouds 104 or a predetermined subset of these public clouds may be considered candidate clouds for the processing job.

The user input may be provided using the application client 110 running on the user device 102. In the present embodiment, a list of cloud metrics may be provided in a user interface screen 115 presented on the user device, such that the user can select from among the presented cloud metrics the particular ones that are important for the current processing job, and can also specify requirements for those metrics.

Figure 1B:
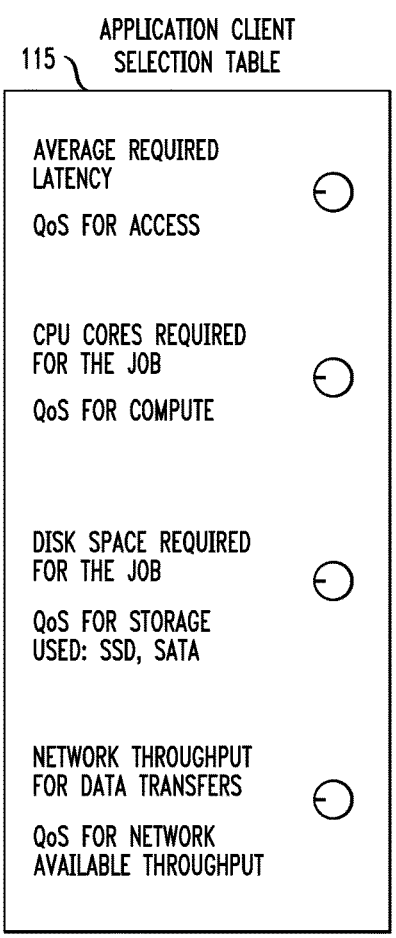
FIGS. 1B, 1C and 1D show interface screens that may be utilized in the system of FIG. 1A.

A more detailed view of an exemplary user interface screen 115 is shown in FIG. 1B, and allows user specification of average required latency, number of CPU cores required for the job, disk space required for the job, and network throughput for data transfers. These specific metrics may be considered examples of QoS metrics for performance of the processing job, although the user interface screen in the present embodiment is also configured to allow direct user specification of QoS requirements for access, compute, storage, available throughput and possibly other QoS requirements for the processing job. Within each of these categories, additional selectability may be provided, such as user selection between utilization of solid state drives (SSDs) and serial advanced technology attachment (SATA) drives for performance of the processing job.

Figure 1C:
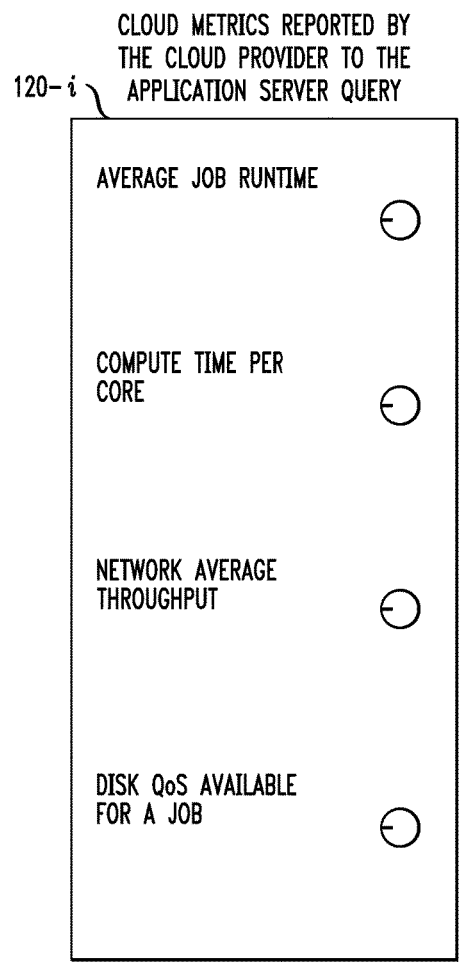

Thus, the user can enter particular requirements for the processing job via the user interface screen 115. The user input is provided from the application client 110 to the application server 114 of public cloud 106 as indicated. The application server 114 interacts with each of the alternative application servers 112 to collect respective sets of parameters 120 from the plurality of different candidate clouds. FIG. 1C shows an example of a given such set of parameters 120-$i$, $i=1, 2, \ldots N$, for one of the candidate clouds 104-$i$. The set of parameters collected from the candidate cloud 104-$i$ in this example includes specific values, ranges or other information characterizing one or more of average job runtime, compute time per CPU core, network average throughput, and disk QoS available for the job. These parameters may be reported by the corresponding cloud service provider via its application server 112 responsive to a query from the application server 114.

The same information may be collected from each of the other candidate clouds, or different information may be collected from different ones of the candidate clouds. Each such set of information 120 may also be presented as an interface screen on user device 102, under the control of the application client 110 and the application servers 112 and 114, such that the various capabilities of each of the candidate clouds relative to the current processing job are made apparent to the user.

The application server 114 can also provide the user with an indication of predicted QoS available for the processing job from one or more of the public clouds 104 if it is not possible for any of those clouds to achieve the particular QoS requested by the user. In such a situation, the application server may request a lower fee for the job from one or more of the cloud service providers in view of their inability to achieve the requested QoS. If at least a given one of the cloud service providers agrees to the lower fee, the user may be provided with a choice between paying the lower fee to accept the lower predicted QoS available from that cloud service provider, or paying more in an attempt to achieve a higher QoS than that predicted by the cloud service provider.

Although the application server 114 in this embodiment is illustratively shown as running in an additional cloud 106 that is separate from the candidate clouds 104, in other embodiments the application server 114 may be implemented in one of the candidate clouds 104, or its functionality may be distributed across multiple such clouds. As noted above, selection between candidate clouds may be performed automatically by the application server 114, based on collected and compiled information characterizing the relative performance capabilities of the candidate clouds 104 for the current processing job. Thus, the application server 114 may be configured to select one or more of the candidate clouds 104 that will actually execute the processing job. A given processing job may therefore be divided between two or more of the public clouds that are selected from a larger group of up to N candidate clouds, where N is greater than two.

In the FIG. 1A embodiment, information regarding the selected cloud for the processing job is communicated between the application client 110 and the application server 114 as illustrated by interaction 125. It is assumed by way of example that a single public cloud 104-2 is selected from among the candidate clouds 104 to perform the processing job, as a result of that public cloud being determined as the fastest of the candidate clouds at the time of job submission, based on multiple parameters that were gathered from the alternative application servers 112 of the respective candidate clouds by the application server 114. Performance of the processing job may involve interaction 130 between the application client 110 and the selected public cloud 104-2. The processing job is executed using a set of virtual machines 140 of the public cloud 104-2.

Figure 1D:
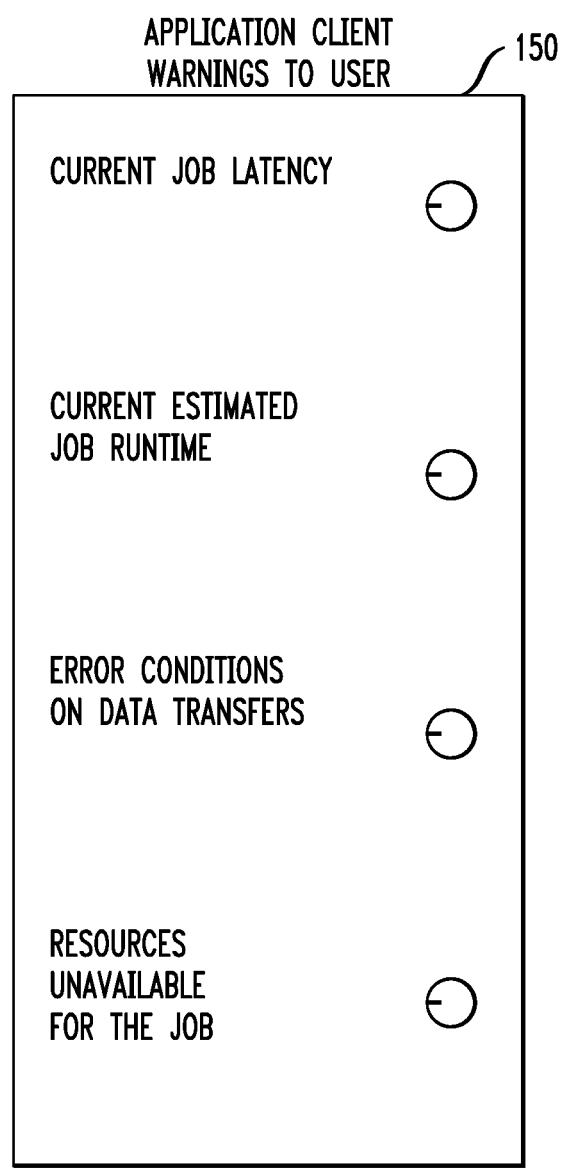

Once the processing job is executing in the selected cloud 104-2, the application client 110 and application servers 112 and 114 may be configured to permit the requesting user to monitor and/or control the processing job. For example, one or more processing metrics relating to execution of the processing job in the selected cloud may be presented to the requesting user via the application client 110 on user device 102. FIG. 1D illustrates one possible user monitoring arrangement, in the form of a user interface screen 150 that is provided on user device 102 and includes information regarding current job latency, current estimated job runtime, error conditions on data transfers, and resources that are unavailable for the job. The interface screen 150 may be utilized to present warnings to the user via the application client 110 relating to the monitored metrics. For example, any metrics that fall below the requirements specified by the user may be highlighted accordingly.

Also, the user may be permitted to control at least one controllable feature of the processing job as it is executing in the selected cloud 104-2, again via one or more interface screens presented on the user device 102 under the control of the application client 110 and one or more of the application servers 112 and 114.

By way of example, the ability to monitor and/or control a given processing job can include determining if the progress of the job has met requirements, identifying the reason or reasons that any aspect of the job has not met requirements, and sending requests to the cloud service provider to remedy the issue. Thus, if an application that is part of the processing job is waiting for a certain cloud resource such as a storage, processing or network transmission resource, an appropriate warning can be sent to the user. A user may also be provided with an opportunity to pay more for higher priority access to the resource.

It is to be appreciated that the particular set of elements shown in FIG. 1A for providing enhanced user involvement in processing job execution in one or more public clouds is presented by way of illustrative example, and in other embodiments additional or alternative elements may be used. Thus, another embodiment may include additional or alternative arrangements of user devices, application clients, application servers, and candidate clouds or other cloud infrastructure.

For example, in one alternative embodiment, the application client 110 on user device 102 could interact directly with the alternative application servers 112 of the respective public clouds 104, such that public cloud 106 and application server 114 could be eliminated. However, use of application server 114 external to user device 102 may be preferred in an arrangement in which user device 102 comprises a mobile telephone or other mobile device with limited battery power. This is because the process of collecting and compiling information from the public clouds in order to allow informed selection of a particular cloud or clouds for performing a processing job can require significant computational resources, and it may be desirable to avoid consuming such resources on the mobile device. Accordingly, in the present embodiment, the application client 110 on the user device 102 initiates application server 114 to provide at least the collecting and compiling functionality, and to report back to the application client as needed, thereby conserving user device resources.

In another possible embodiment of system 100, the application server 114 may be associated with an Internet service provider or other entity that acts as a broker for the public clouds 104 but is otherwise independent of the corresponding cloud service providers. Such an arrangement is particularly useful for those individuals, business entities, IT administrators or other users that do not want to incur the costs or complexities associated with implementation and maintenance of application server 114 or its associated cloud 106.

The broker implementing the application server 114 may receive commissions from the cloud service providers of the respective public clouds 104 for any processing jobs that the broker places with those clouds, and can negotiate with the cloud service providers for access to any public cloud parameter sets or other information required to deliver the service to users. Also, the broker can sell various QoS levels to users and select particular available public cloud resources for use in meeting a requested QoS level for a given processing job. The user may pay the broker in accordance with the achieved QoS level.

The broker can also move resources during a given processing job between multiple clouds in order to meet QoS requirements that a single cloud service provider could not otherwise meet on its own. The broker can ensure that security requirements are met, for example, by generating private keys for the user without itself maintaining copies of the keys. Also, the broker can run applications in the cloud infrastructure that monitor the public clouds 104 in the event that the associated cloud service providers do not fully expose all necessary operating parameters. The broker can possibly make such monitoring results available back to the cloud service providers.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

The operation of the system 100 will now be described in greater detail with reference to the flow diagram of FIG. 2, which shows a set of operations performed at least in part using the cloud infrastructure of system 100 in an illustrative embodiment.

The process as shown includes steps 200 through 208, which are assumed to be performed using elements of the cloud infrastructure such as processing devices of public cloud 106 and one or more of the public clouds 104, although in other embodiments one or more such steps may be implemented at least in part by other system elements. Again, the term "user" is intended to be broadly construed, and may refer to the user device 102 or an associated entity, or may collectively refer to a combination of both the user device and an associated entity. Embodiments of the invention are not limited in terms of the particular user configuration utilized.

In step 200, input is received from a requesting user defining one or more requirements of a processing job to be performed in cloud infrastructure. The term "processing job" as used herein is intended to encompass any type of functionality that may be performed in cloud infrastructure for a particular user, and will generally involve the execution of at least one application, which may include, for example, an application that involves processing, storing and transmitting user data.

It is to be understood that the term "application" as used herein is intended to be broadly construed. Accordingly, references herein to multiple applications should be understood to encompass, for example, a set of entirely different applications or a set of different instances of a given application, as well as various combinations of different applications and application instances. An application instance is therefore considered a type of application as that latter term is broadly applied herein.

In step 202, a plurality of different candidate clouds are identified for performing the processing job for the requesting user at least in part responsive to the user input received in step 200.

In step 204, respective sets of parameters are collected from the plurality of different candidate clouds with each such set of parameters characterizing at least one aspect of a manner in which the processing job would be performed in the corresponding candidate cloud.

In step 206, information characterizing the collected sets of parameters is compiled so as to permit informed selection of at least one of the candidate clouds for performing the processing job. As indicated previously, this selection may be made by the user or by another system entity.

For example, the selection may be made automatically by the application server 114 in accordance with input previously provided by the user.

In step 208, the requesting user is permitted to monitor and/or control the processing job as it is executing in the selected cloud(s).

Figure 2:
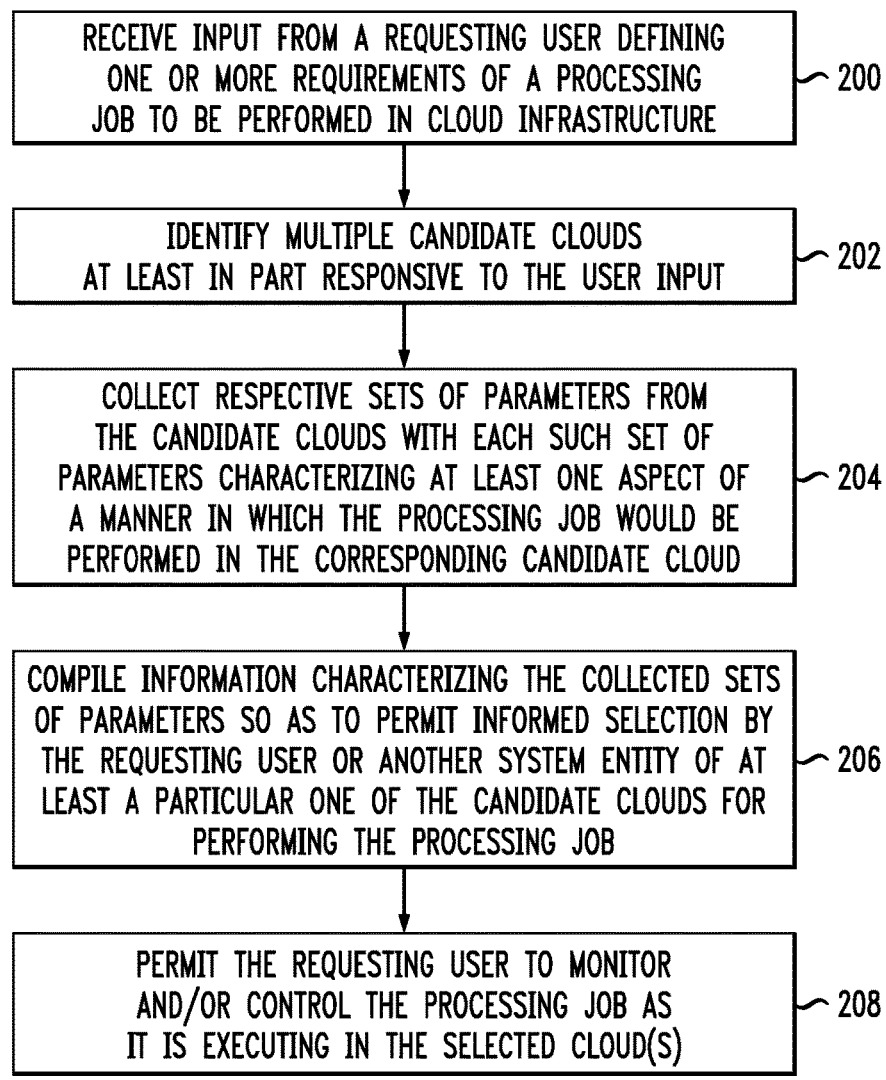
FIG. 2 is a flow diagram of a process for selecting between multiple candidate clouds in the FIG. 1A system.

The process as illustrated in FIG. 2 may be repeated serially for each of a plurality of processing jobs of the requesting user, or multiple instances of the process may be performed at least in part in parallel for multiple processing jobs of the user. Also, similar processes can be performed on behalf of other users that utilize the public clouds 104 of the cloud infrastructure of system 100.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing user control over processing job execution in system 100. For example, the ordering of the process steps may be varied in other embodiments, or certain steps may be performed concurrently with one another rather than serially. Also, as indicated above, one or more of the process steps may be repeated periodically for a given user, or performed in parallel for the given user or multiple users.

It is to be appreciated that functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The above-described embodiments can provide a number of significant advantages relative to conventional practice. For example, one or more of these embodiments can be used to ensure that a particular processing job is being run in an optimal manner that satisfies the particular QoS needs of the requesting user. Users are provided with an ability to select in an informed manner a particular cloud or clouds for executing a given processing job, leading to enhanced user satisfaction with cloud-based services. This can lead to more widespread adoption of public cloud processing models, and as a result will ultimately benefit not only users but also cloud service providers.

Also, one or more of the disclosed embodiments can provide a user with the flexibility to build its own set of criteria to monitor the applications or other processing jobs running in the cloud infrastructure of system 100. Users can evaluate the efficiency and other performance metrics of the processing job, and thereby ensure that they are receiving a level of performance that is satisfactory to them, or can renegotiate with the cloud service provider for different QoS requirements as appropriate.

Figure 3:
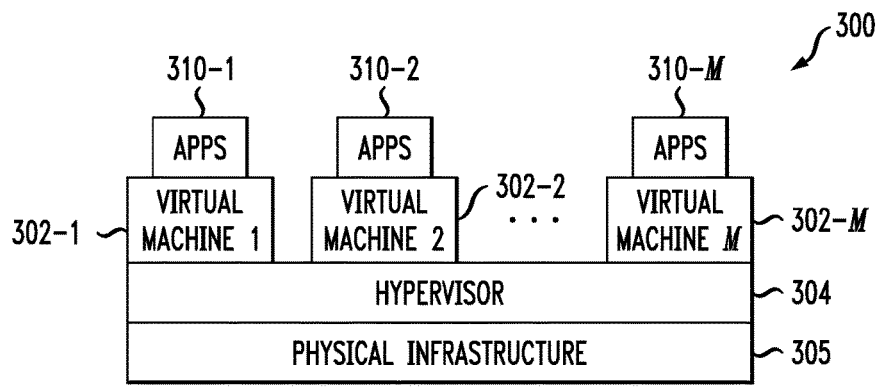
FIGS. 3 and 4 show examples of processing platforms that may be utilized to implement at least a portion of the FIG. 1A system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the cloud infrastructure comprising at least a portion of the public clouds 104 and 106. Thus, the candidate clouds may be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
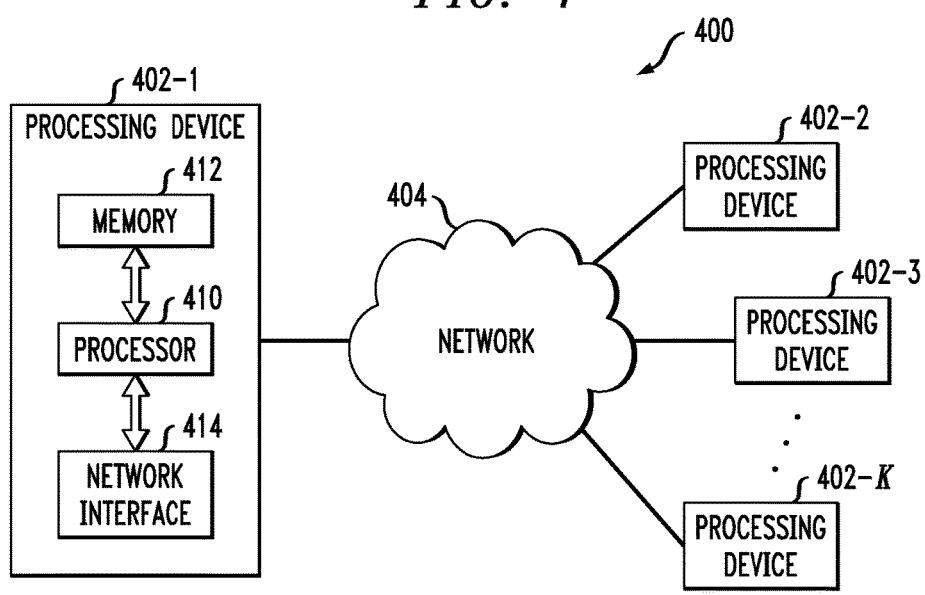

Multiple elements of information processing system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the disclosed techniques are applicable to a wide variety of other types of devices and systems that can benefit from intelligent selection between multiple candidate clouds. Also, the particular configuration of system and device elements shown in FIGS. 1A, 3 and 4, the interface screens shown in FIGS. 1B-1D, and the cloud selection process shown in FIG. 2, can be varied in other embodiments. Moreover, the particular cloud metrics or other parameters that are collected from the candidate clouds, the particular information that is compiled from such parameters, and the manner in which selection among candidate clouds is performed using such information, may be altered in other embodiments in order to suit the needs of a particular implementation. These and numerous other alternative embodiments within the scope of the appended claims will be readily apparent to those skilled in the art.

What is claimed is:

1. A method comprising:
   receiving, via an application client on a user device, one or more user-specified quality of service (QoS) metrics for performance of a given processing job;
   initiating, via the application client, a first application server on at least a first cloud responsive to receiving the user-specified QoS metrics, the first application server being configured to interact with one or more additional application servers running on a plurality of candidate clouds to collect respective sets of parameters from the plurality of candidate clouds, the respective sets of parameters comprising information characterizing available capabilities of each of the plurality of candidate clouds;
   determining that a service provider of a given one of the plurality of candidate clouds does not expose one or more operating parameters needed to determine the predicted QoS available for the given candidate cloud;
   directing, via the application client, the first application server to run one or more monitoring applications on the given candidate cloud responsive to determining that the service provider of the given candidate cloud does not expose the one or more operating parameters needed to determine the predicted QoS available for the given candidate cloud;
   the first application server utilizing the one or more monitoring applications running on the given candidate cloud to determine the predicted QoS available for the given candidate cloud;
   presenting, via the application client on the user device, a comparison of the user-specified QoS metrics to a predicted QoS available for each of the plurality of candidate clouds, the predicted QoS available for each of the plurality of candidate clouds being determined by the first application server based on the collected sets of parameters;
   receiving, at the application client, a selection of at least one of the plurality of candidate clouds to execute the given processing job, the first application server being configured to execute the given processing job on the selected cloud responsive to the selection;

monitoring, via the application client, performance metrics of the given processing job as it executes on the selected candidate cloud;

determining, via the application client, that execution of the given processing job on the selected candidate cloud is not meeting one or more of the user-specified QoS metrics based on the monitored performance metrics;

identifying, via the application client, one or more reasons that the execution of the given processing job is not meeting one or more of the user-specified QoS metrics; and providing, via the application client, a warning indicating the one or more reasons that the execution of the given processing job on the selected candidate cloud is not meeting one or more of the user-specified QoS metrics.

2. The method of claim 1 wherein identifying the one or more reasons that the execution of the given processing job is not meeting one or more of the user-specified QoS metrics comprises identifying an application that is part of the given processing job which is waiting for a given cloud resource, the given cloud resource comprises at least one of a storage, processing and network transmission resource.

3. The method of claim 2 further comprising, sending, via the application client, one or more requests to a service provider of the selected candidate cloud to provide priority access to the given cloud resource.

4. The method of claim 1 further comprising the application client directing the first application server to move, during execution of the given processing job, one or more resources between multiple candidate clouds to meet the user-specified QoS requirements.

5. The method of claim 1 wherein the user-specified QoS metrics comprises access, compute, storage and network available throughput QoS requirements.

6. The method of claim 5 wherein:
the access QoS requirement comprises an average latency required;
the compute QoS requirement comprises a number of central processing unit (CPU) cores required for the given processing job;
the storage QoS requirement comprises a disk space required for the given processing job; and
the network available throughput QoS requirement comprises a network throughput for data transfers.

7. The method of claim 6 wherein the information characterizing available capabilities of a given one of the plurality of candidate clouds for performance of the given processing job comprises:
an average job runtime for other processing jobs executing on the given candidate cloud;
a compute time per CPU core for other processing jobs executing on the given candidate cloud;
a disk QoS available for the given processing job; and
a network average throughput.

8. The method of claim 1 wherein the monitored performance metrics comprise a current latency of the given processing job, a current estimated runtime of the given processing job, error conditions on data transfers related to the given processing job, and one or more resources that are unavailable for the given processing job.

9. The method of claim 1 further comprising controlling, via the application client, execution of the given processing job on the selected candidate cloud.

10. The method of claim 1 wherein the user device comprises a mobile device, and wherein the first cloud on which the first application server is initiated is distinct from the mobile device such that collecting the respective sets of parameters from the plurality of candidate clouds and determining the predicted QoS available for each of the plurality of candidate clouds does not utilize computational resources of the mobile device.

11. The method of claim 1 wherein the first cloud on which the first application server is initiated is distinct from the plurality of candidate clouds.

12. A computer program product comprising a non-transitory processor-readable storage medium having encoded therein executable code of one or more software programs, wherein the one or more software programs when executed cause at least one processing device to implement an application client configured:

to receive one or more user-specified quality of service (QoS) metrics for performance of a given processing job;

to initiate a first application server on at least a first cloud responsive to receiving the user-specified QoS metrics, the first application server being configured to interact with one or more additional application servers running on a plurality of candidate clouds to collect respective sets of parameters from the plurality of candidate clouds, the respective sets of parameters comprising information characterizing available capabilities of each of the plurality of candidate clouds;

to determine that a service provider of a given one of the plurality of candidate clouds does not expose one or more operating parameters needed to determine the predicted QoS available for the given candidate cloud;

to direct the first application server to run one or more monitoring applications on the given candidate cloud responsive to determining that the service provider of the given candidate cloud does not expose the one or more operating parameters needed to determine the predicted QoS available for the given candidate cloud;

the first application server utilizing the one or more monitoring applications running on the given candidate cloud to determine the predicted QoS available for the given candidate cloud;

to present a comparison of the user-specified QoS metrics to a predicted QoS available for each of the plurality of candidate clouds, the predicted QoS available for each of the plurality of candidate clouds being determined by the first application server based on the collected sets of parameters;

to receive a selection of at least one of the plurality of candidate clouds to execute the given processing job, the first application server being configured to execute the given processing job on the selected cloud responsive to the selection;

to monitor performance metrics of the given processing job as it executes on the selected candidate cloud;

to determine that execution of the given processing job on the selected candidate cloud is not meeting one or more of the user-specified QoS metrics based on the monitored performance metrics;

to identify one or more reasons that the execution of the given processing job is not meeting one or more of the user-specified QoS metrics; and to provide a warning indicating the one or more reasons that the execution of the given processing job on the selected candidate cloud is not meeting one or more of the user-specified QoS metrics.

13. The computer program product of claim 12 wherein identifying the one or more reasons that the execution of the given processing job is not meeting one or more of the user-specified QoS metrics comprises identifying an application that is part of the given processing job which is waiting for a given cloud resource, the given cloud resource comprising at least one of a storage, processing and network transmission resource.

14. The computer program product of claim 13 wherein the application client is further configured to send one or more requests to a service provider of the selected candidate cloud to provide priority access to the given cloud resource.

15. The computer program product of claim 12 wherein the application client is further configured to direct the first application server to move, during execution of the given processing job, one or more resources between multiple candidate clouds to meet the user-specified QoS requirements.

16. The computer program product of claim 12 wherein the at least one processing device implementing the application client comprises a mobile user device, and wherein the first cloud on which the first application server is initiated is distinct from the mobile device such that collecting the respective sets of parameters from the plurality of candidate clouds and determining the predicted QoS available for each of the plurality of candidate clouds does not utilize computational resources of the mobile device.

17. An apparatus comprising:
at least one processing device comprising a processor coupled to a memory;
the at least one processing device being configured to implement an application client configured:
to receive one or more user-specified quality of service (QoS) metrics for performance of a given processing job;
to initiate a first application server on at least a first cloud responsive to receiving the user-specified QoS metrics, the first application server being configured to interact with one or more additional application servers running on a plurality of candidate clouds to collect respective sets of parameters from the plurality of candidate clouds, the respective sets of parameters comprising information characterizing available capabilities of each of the plurality of candidate clouds;
to determine that a service provider of a given one of the plurality of candidate clouds does not expose one or more operating parameters needed to determine the predicted QoS available for the given candidate cloud;
to direct the first application server to run one or more monitoring applications on the given candidate cloud responsive to determining that the service provider of the given candidate cloud does not expose the one or more operating parameters needed to determine the predicted QoS available for the given candidate cloud;
the first application server utilizing the one or more monitoring applications running on the given candidate cloud to determine the predicted QoS available for the given candidate cloud;
to present a comparison of the user-specified QoS metrics to a predicted QoS available for each of the plurality of candidate clouds, the predicted QoS available for each of the plurality of candidate clouds being determined by the first application server based on the collected sets of parameters;
to receive a selection of at least one of the plurality of candidate clouds to execute the given processing job, the first application server being configured to execute the given processing job on the selected cloud responsive to the selection;
to monitor performance metrics of the given processing job as it executes on the selected candidate cloud;
to determine that execution of the given processing job on the selected candidate cloud is not meeting one or more of the user-specified QoS metrics based on the monitored performance metrics;
to identify one or more reasons that the execution of the given processing job is not meeting one or more of the user-specified QoS metrics; and
to provide a warning indicating the one or more reasons that the execution of the given processing job on the selected candidate cloud is not meeting one or more of the user-specified QoS metrics.

18. The apparatus of claim 17 wherein identifying the one or more reasons that the execution of the given processing job is not meeting one or more of the user-specified QoS metrics comprises identifying an application that is part of the given processing job which is waiting for a given cloud resource, the given cloud resource comprising at least one of a storage, processing and network transmission resource.

19. The apparatus of claim 18 wherein the application client is further configured to send one or more requests to a service provider of the selected candidate cloud to provide priority access to the given cloud resource.

20. The apparatus of claim 17 wherein the application client is further configured to direct the first application server to move, during execution of the given processing job, one or more resources between multiple candidate clouds to meet the user-specified QoS requirements.

21. The apparatus of claim 17 wherein the at least one processing device implementing the application client comprises a mobile user device, and wherein the first cloud on which the first application server is initiated is distinct from the mobile device such that collecting the respective sets of parameters from the plurality of candidate clouds and determining the predicted QoS available for each of the plurality of candidate clouds does not utilize computational resources of the mobile device.

* * * * *